United States Patent
Sasaki et al.

(10) Patent No.: US 7,075,272 B2
(45) Date of Patent: Jul. 11, 2006

(54) CONTROL DEVICE FOR VEHICLE AC GENERATOR

(75) Inventors: Junya Sasaki, Tokyo (JP); Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 100 days.

(21) Appl. No.: 10/852,105

(22) Filed: May 25, 2004

(65) Prior Publication Data
US 2005/0134237 A1    Jun. 23, 2005

(30) Foreign Application Priority Data
Dec. 17, 2003    (JP)    ............... P2003-420057

(51) Int. Cl.
H02P 9/00    (2006.01)
H02P 9/14    (2006.01)
H02P 9/30    (2006.01)
H02P 11/00    (2006.01)
H02J 7/14    (2006.01)

(52) U.S. Cl. ................ 322/28; 322/27; 322/29; 322/36

(58) Field of Classification Search ........... 322/27–29, 322/36
See application file for complete search history.

(56) References Cited

U.S. PATENT DOCUMENTS

| | | | | |
|---|---|---|---|---|
| 3,525,924 A | * | 8/1970 | Atterholt | 322/28 |
| 4,233,556 A | * | 11/1980 | Nagel et al. | 322/28 |
| 4,636,706 A | * | 1/1987 | Bowman et al. | 322/28 |
| 4,739,243 A | * | 4/1988 | Iwatani et al. | 322/10 |
| 4,754,212 A | * | 6/1988 | Mashino | 322/28 |
| 4,797,800 A | * | 1/1989 | Simizu | 363/37 |
| 4,973,896 A | * | 11/1990 | Shiga et al. | 322/28 |
| 5,079,496 A | * | 1/1992 | Pierret et al. | 322/28 |
| 5,105,143 A | * | 4/1992 | Marumoto et al. | 322/28 |
| 5,140,253 A | * | 8/1992 | Itoh | 322/28 |
| 5,448,154 A | * | 9/1995 | Kanke et al. | 322/28 |
| 5,581,172 A | * | 12/1996 | Iwatani et al. | 322/28 |
| 5,629,606 A | * | 5/1997 | Asada | 322/28 |
| 5,903,129 A | * | 5/1999 | Okuno et al. | 318/721 |
| 6,060,866 A | * | 5/2000 | Sada et al. | 322/59 |
| 6,075,348 A | * | 6/2000 | Iwatani et al. | 322/32 |
| 6,204,643 B1 | * | 3/2001 | Kouwa et al. | 322/28 |
| 6,223,106 B1 | * | 4/2001 | Yano et al. | 701/22 |
| 6,271,649 B1 | * | 8/2001 | Iwatani | 322/29 |
| 6,426,609 B1 | * | 7/2002 | Tanaka et al. | 322/19 |
| 6,433,519 B1 | * | 8/2002 | Taniguchi et al. | 322/28 |

(Continued)

FOREIGN PATENT DOCUMENTS

JP    05-038076 A    2/1993

Primary Examiner—Darren Schuberg
Assistant Examiner—Pedro J. Cuevas
(74) Attorney, Agent, or Firm—Sughrue Mion, PLLC

(57) ABSTRACT

In a control apparatus of a vehicle AC generator, a flip-flop for receiving a clock pulse with a constant period and a control pulse is used. The clock pulse sets the control period at the constant period, and decides an on timing of the power transistor in this control period. The control pulse decides an off timing. A load response control circuit performs a load response control to adjust an on time ratio of the power transistor from a lower limit to an upper limit in accordance with an increase in load, and a second control signal circuit adjusts the on time ratio from a regulated value close to the upper limit to the upper limit.

19 Claims, 5 Drawing Sheets

U.S. PATENT DOCUMENTS

| | | | |
|---|---|---|---|
| 6,462,517 B1 * | 10/2002 | Asada | 322/28 |
| 6,486,571 B1 * | 11/2002 | Miller et al. | 307/140 |
| 6,566,845 B1 * | 5/2003 | Taniguchi et al. | 322/28 |
| 6,621,251 B1 * | 9/2003 | Ogino et al. | 322/28 |
| 6,661,110 B1 * | 12/2003 | Suzuki et al. | 290/40 C |
| 6,717,385 B1 * | 4/2004 | Asada et al. | 322/24 |
| 6,737,835 B1 * | 5/2004 | Taniguchi | 322/29 |
| 6,756,770 B1 * | 6/2004 | Watanabe et al. | 322/28 |
| 6,936,996 B1 * | 8/2005 | Uematsu et al. | 322/99 |
| 6,959,777 B1 * | 11/2005 | Beckerman et al. | 180/65.1 |

* cited by examiner

CONTROL DEVICE FOR VEHICLE AC GENERATOR

BACKGROUND OF THE INVENTION

1. Field of the Invention

The present invention relates to a control device for a vehicle AC generator which is mounted on a vehicle such as an automobile, charges an on-board battery and feeds other electric loads of the vehicle.

2. Description of the Related Art

In general, an AC generator is mounted on a vehicle such as an automobile, and by the rectified output of this AC generator, an on-board battery is charged and various electric loads of the vehicle are fed. This vehicle AC generator is driven by an engine, and since its rectified output voltage increases as the engine speed increases, the rectified output is adjusted by a voltage control device. This voltage control device monitors the rectified output of the vehicle AC generator, and turns on and off the field current of the vehicle AC generator by a power transistor so that the rectified output voltage of the vehicle AC generator falls within a specified range.

An on time ratio of the power transistor indicates a generation rate of the AC generator, this generation rate is monitored by a generation rate monitor circuit, and its monitor output is supplied to a vehicle electronic control unit (ECU). The vehicle electronic control unit (ECU) is constructed by using a microcomputer, and performs, for example, idle control of an engine by means of the generation rate monitor output.

JP-A-5-38076 discloses that an energization rate of a power transistor is detected through a collector voltage of the power transistor.

However, in the voltage control device of the vehicle AC generator, since the power transistor is turned on and off in accordance with the rectified output voltage, the on/off timing is generally random. Thus, the collector voltage of the power transistor disclosed in the above publication also rises up and falls down at random timings, and its frequency is also changed. Accordingly, in order to perform a control by the vehicle electronic control unit (ECU) using this, there is serious difficulty in designing its algorism.

SUMMARY OF THE INVENTION

In view of this disadvantage, a first object of the present invention is to provide a control device for a vehicle AC generator which can control a power transistor at a constant period.

A second object of the present invention is to provide a control device for a vehicle AC generator which can improve such a problem that in a load response control, for example, when a generation rate is temporarily lowered in the case where the load response control is released, a monitor output of a generation rate monitor circuit can not catch the lowering of the generation rate.

In order to achieve the first object, a control device for a vehicle AC generator according to this invention, which outputs a rectified AC output and feeds it to an on-board battery and electric loads of a vehicle. The control device includes a power transistor, a flip-flop, and a generation rate monitor circuit. The power transistor controls a field current of the vehicle AC generator. The flip-flop on/off controls the power transistor in each of control periods repeated at a constant period. The generation rate monitor circuit monitors an on time ratio of the power transistor to monitor a generation rate. In the control device, the flip-flop receives a clock pulse with a constant period and a control pulse, the clock pulse sets the control period and decides an on timing of the power transistor in this control period, and the control pulse decides an off timing of the power transistor in the control period.

In order to achieve the second object, a control device for a vehicle AC generator according to this invention, which outputs a rectified AC output and feeds it to an on-board battery and electric loads of a vehicle. The control device includes a voltage control device and a generation rate monitor circuit. The voltage control device repeatedly gives, at a constant period, control periods to a power transistor for controlling a field current of the vehicle AC generator and for adjusting an on time ratio of the power transistor in each of the control periods to control a generation rate. The generation rate monitor circuit monitors the generation rate. In the control device, the voltage control device includes a load response control circuit for controlling the generation rate in accordance with an increase in load, the load response control circuit includes a first and a second control signal circuits. The first control signal circuit performs a load response control for adjusting the generation rate between a lower limit and an upper limit in accordance with the increase in the load. The second control signal circuit performs, in a case where the load response control is released, a regulated load response control for adjusting the generation rate between a regulated value closer to the upper limit than to the lower limit and the upper limit in accordance with the increase in the load.

In the control device for the vehicle AC generator according to the invention and corresponding to the first object, the flip-flop is used, and the clock pulse with the constant period supplied to this flip-flop repeatedly sets the control period at the constant period and decides the on timing of the power transistor in this control period, and the control pulse supplied to the flip-flop decides the off timing of the power transistor in the control period. Thus, the power transistor is consequently controlled at the constant control period, and the monitor output of the generation rate monitor circuit for monitoring the generation rate in the control period also comes to have the constant period. Accordingly, also in the case where this monitor output is supplied to, for example, an electronic control unit using a microcomputer to perform an engine control, the design of its architecture can be simplified.

In the control device for the vehicle AC generator according to this invention and corresponding to the second object, the load response control circuit of the voltage control device includes the first and the second control signal circuits, the first control signal circuit performs the load response control for adjusting the generation rate between the lower limit and the upper limit in accordance with the increase in the load, and the second control signal circuit performs, in the case where the load response control is released, the regulated load response control for adjusting the generation rate between the regulated value closer to the upper limit than to the lower limit and the upper limit in accordance with the increase in the load. Accordingly, for example, in the case where the load response control is released, even if the generation rate is temporarily lowered, the regulated load response control is performed subsequently to that. On the basis of the regulated load response control performed subsequently to the temporal lowering of the generation rate, the adjustment of the generation rate continues in plural continuous control periods, so that the generation rate monitor circuit can certainly catch the lowering of the generation rate, and also in the case where the monitor output is supplied to, for example, the electronic control unit using the microcomputer to perform the engine control, a more accurate control can be performed.

DETAILED DESCRIPTION OF THE INVENTION

Hereinafter, some embodiments will be described with reference to the drawings.

Embodiment 1

Figure 1:
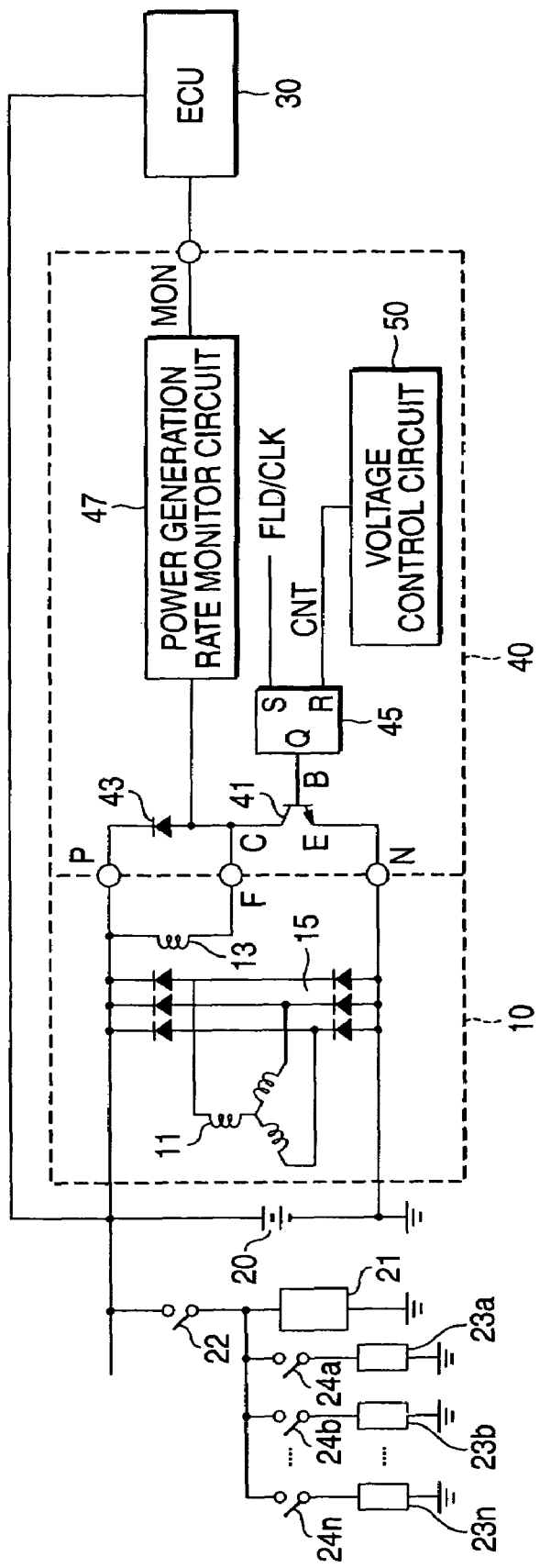
FIG. 1 is an electric circuit diagram showing embodiment 1 of a control device for a vehicle AC generator according to the invention.

FIG. 1 is an electric circuit diagram showing embodiment 1 of a control device for a vehicle AC generator according to the invention. This embodiment 1 is the embodiment corresponding to the first object of the invention.

The control device for the vehicle AC generator shown in FIG. 1 includes an AC generator 10, an on-board battery 20, other vehicle electric loads 21, 23a, 23b, . . . , 23n, a vehicle electronic control unit (ECU) 30, and a voltage control device 40 for the AC generator 10.

The AC generator 10 includes an armature coil 11, a field coil 13 and a full-wave rectifier circuit 15. This AC generator 10 is constructed such that an armature core around which the armature coil 11 is wound constitutes a rotator, and this rotator is driven by an engine mounted on a vehicle. A field core around which the field coil 13 is wound constitutes a stator and is fixed to the outer periphery of the rotator so as to surround it. The armature coil 11 is a three-phase coil, and three-phase star connection is adopted in this embodiment 1.

The full-wave rectifier circuit 15 is a three-phase full-wave rectifier circuit, is constructed by using six diodes, and is disposed in the inside of a bracket of the AC generator 10. A positive side output terminal of the full-wave rectifier circuit 15 constitutes a positive side rectified output terminal P of the AC generator 10, and a negative side output terminal thereof constitutes a negative side rectified output terminal N of the AC generator 10. One end of the field coil 13 is connected to the positive side rectified output terminal P, and the other end thereof is connected to a field terminal F of the AC generator 10.

The on-board battery 20 is, for example, a 12-volt battery, and its positive terminal is connected to the positive side rectified output terminal P of the AC generator 10. A negative terminal of the on-board battery 20 is connected to the negative side rectified output terminal N of the AC generator 10, and is also connected to a reference potential point such as a vehicle body. The first electric load 21 is connected to the on-board battery 20 through an ignition switch 22. This electric load 21 is an ignition circuit of the engine or the like and is always fed through the ignition switch 22 during the driving of the engine. The second electric load groups 23a, 23b, . . . , 23n are connected in parallel to the on-board battery 20 through switches 24a, 24b, . . . , 24n. The second electric loads 23 include large capacity electric loads such as a lamp, an air conditioner, and a heater, and are respectively fed when the corresponding switches 24a, 24b, . . . , 24n are turned on. The electric load to the AC generator 10 increases in accordance with the application of the second electric loads 23a, 23b, . . . , 23n.

The vehicle electronic control unit (ECU) is constructed of the microcomputer, and controls an ignition timing of the engine, a fuel injection amount of the engine, an idle speed of the engine and the like in accordance with the state of the engine and the vehicle.

The voltage control device 40 for the AC generator 10 includes a power transistor 41, a flywheel diode 43, an SR flip-flop 45, a generation rate monitor circuit 47 and a voltage control circuit 50. The power transistor 41 turns on and off the field current flowing through the field coil 13, and for example, an NPN power transistor is used. Its collector C is connected to the field terminal F of the AC generator 10, and its emitter E is connected to the negative side rectified output terminal N of the AC generator 10. The flywheel diode 43 is connected in parallel to the field coil 13. The generation rate monitor 47 is connected to the collector C of the power transistor 41, and detects an on time ratio TRon of the power transistor 41. The on time ratio TRon is given as a generation rate monitor output MON to the vehicle electronic control unit (ECU) 30. The vehicle electronic control unit (ECU) 30 controls, for example, the idle speed of the engine through the generation rate monitor output MON.

The SR flip-flow 45 includes a set input S, a reset input R and an output Q. The output Q of this flip-flop 45 is connected to a base B of the power transistor 41, and drives the power transistor 41. A field clock pulse FLD/CLK with a constant period is supplied to the set input S of the SR flip-flop 45, the output Q of the SR flip-flop 45 rises up every time the field clock pulse FLD/CLK is given, and a constant control period T is repeatedly given. The power transistor 41 is turned on at the start of the individual control period every time the field clock pulse FLD/CLK rises up. A control pulse CNT is supplied to the reset input R from the voltage control circuit 50. In the state where the power transistor 41 is on/off controlled, the control pulse CNT is given in the time period of the individual control period T, and returns the power transistor 41 into the off state at the timing of the rising thereof. The position or phase of the control pulse CNT with respect to the field clock pulse FLD/CLK is adjusted in the voltage control circuit 50 in accordance with the control amount.

Specifically, the Q output of the SR flip-flop 45 comes to have a high level (HIGH) every time the field clock pulse FLD/CLK is received, and the power transistor 41 is turned on. Accordingly, the field clock pulse FLD/CLK becomes the on pulse for the power transistor 41 and decides the on timing, and further repeatedly gives the control period T to the power transistor 41 at a constant period. The repetition period of the control period T is the period of the field clock pulse FLD/CLK, and the length of the control period T is also equal to the period of the field clock pulse FLD/CLK. The output Q of the SR flip-flop 45 is returned to a low level (LOW) every time the control pulse CNT supplied from the voltage control circuit 50 to the reset input R rises, and the power transistor 41 is returned into the off state. Accordingly, the control pulse CNT becomes an off pulse to the power transistor 41, and decides the off timing.

Figure 2:
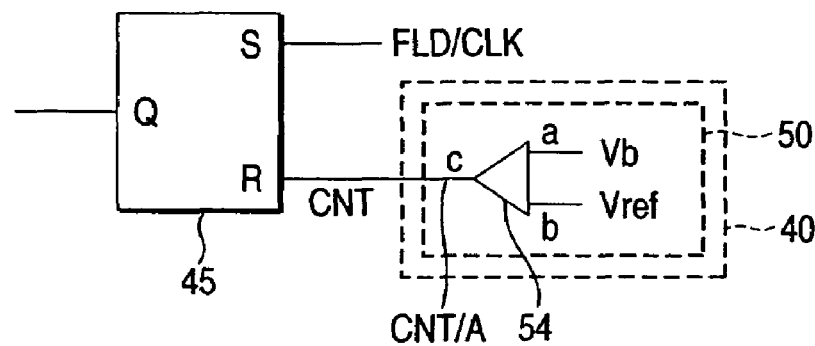
FIG. 2 is an electric circuit diagram showing the details of a part of a voltage control device in the embodiment 1.

FIG. 2 shows an inner circuit of the voltage control circuit 50. The voltage control circuit 50 of this embodiment 1 adjusts the rising timing of the control pulse CNT in accordance with a battery voltage Vb of the on-board battery 20, and includes a comparator 54. In this comparator 54, an input a receives the battery voltage Vb and an input b receives a reference voltage Vref. An output c of the comparator 54 is a control pulse CNT/A rising to a high level (HIGH) when the battery voltage Vb becomes the reference voltage Vref or higher, and in the embodiment 1, the control pulse CNT/A becomes the control pulse CNT as it is, and is supplied to the base B of the power transistor 41.

Figure 3A:
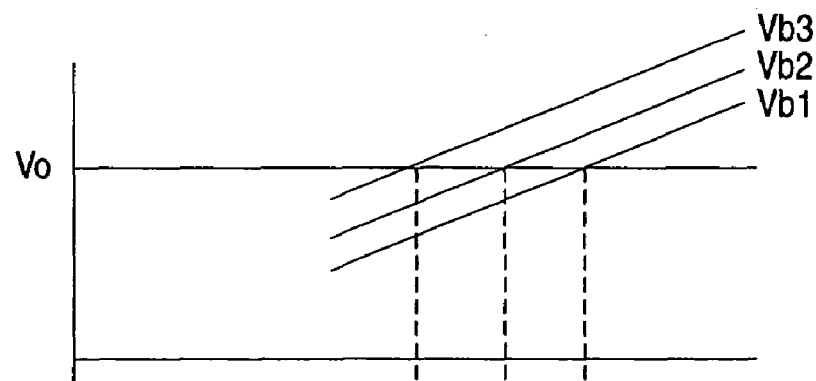
FIGS. 3A and 3B are operation explanatory diagrams of the embodiment 1.
Figure 3B:
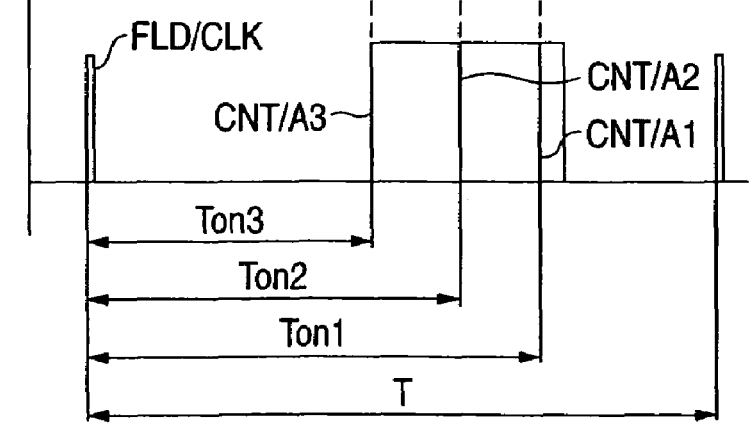

FIGS. 3A and 3B are operation explanatory diagrams of the embodiment 1. FIG. 3A shows a relation between the field clock pulse FLD/CLK and the control pulse CNT/A, and FIG. 3B shows a relation between the control pulse CNT/A and the battery voltage Vb. With respect to the field clock pulse FLD/CLK, two adjacent pulses are shown, and a time period between these two field clock pulses FLD/CLK becomes the control period T. The field clock pulse FLD/CLK is repeatedly generated at the constant period and at the start of the individual control period T. This field clock pulse FLD/CLK is made the reference, and the rising timing of the control pulse CNT/A with respect to the field clock pulse FLD/CLK is adjusted in accordance with the change of the battery voltage Vb.

FIG. 3B typically shows three battery voltage characteristics Vb1, Vb2 and Vb3. The characteristic Vb1 indicates a change of the battery voltage Vb when the on-board battery 20 is charged from a low voltage value to an increased value, the characteristic Vb3 indicates a change of the battery voltage Vb when it is charged from a high voltage value to an increase value, and the characteristic Vb2 indicates a change of the battery voltage Vb when it is charged from an intermediate value to an increased value. In accordance with the changes of the characteristics Vb1, Vb2 and Vb3, the intersections between the characteristics Vb1, Vb2 and Vb3 and the reference voltage Vref successively advance to the field clock pulse FLD/CLK, and the rising timing of the control pulse CNT/A advances from the rising characteristic CNT/A1 through CNT/A2 to CNT/A3. In accordance with the changes of the rising characteristics CNT/A1, CNT/A2 and CNT/A3, the on period Ton of the power transistor 41 is changed from Ton1 to Ton3 through Ton2.

The power transistor 41 is turned on at the constant period by the field clock pulse FLD/CLK, and the on period Ton is changed by the rising timing of the control pulse CNT, and therefore, the on time ratio TRon of the power transistor 41 in the individual control period T is decided by the control pulse CNT. The on time ratio TRon of the power transistor 41 is the on time ratio of the field current to the field coil 13 of the AC generator 10, and indicates a generation rate G of the AC generator 10.

As stated above, in the embodiment 1, the power transistor 41 is turned on at the constant period by the field clock pulse FLD/CLK, and the control period T repeated at the constant period is set, and further, the on time ratio TRon of the power transistor 41 in the individual control period T and the generation rate G of the AC generator 10 are adjusted by the rising timing of the control pulse CNT, so that the rectified output voltage of the AC generator 10 is adjusted. By controlling the power transistor 41 at the constant period, the monitor output MON of the generation rate monitor circuit 45 for monitoring the collector potential of the power transistor 41 also comes to have the constant period, so that the algorism of the electronic control unit 30 using this monitor output MON is simplified, and a more accurate electronic control becomes possible.

Embodiment 2

Figure 4:
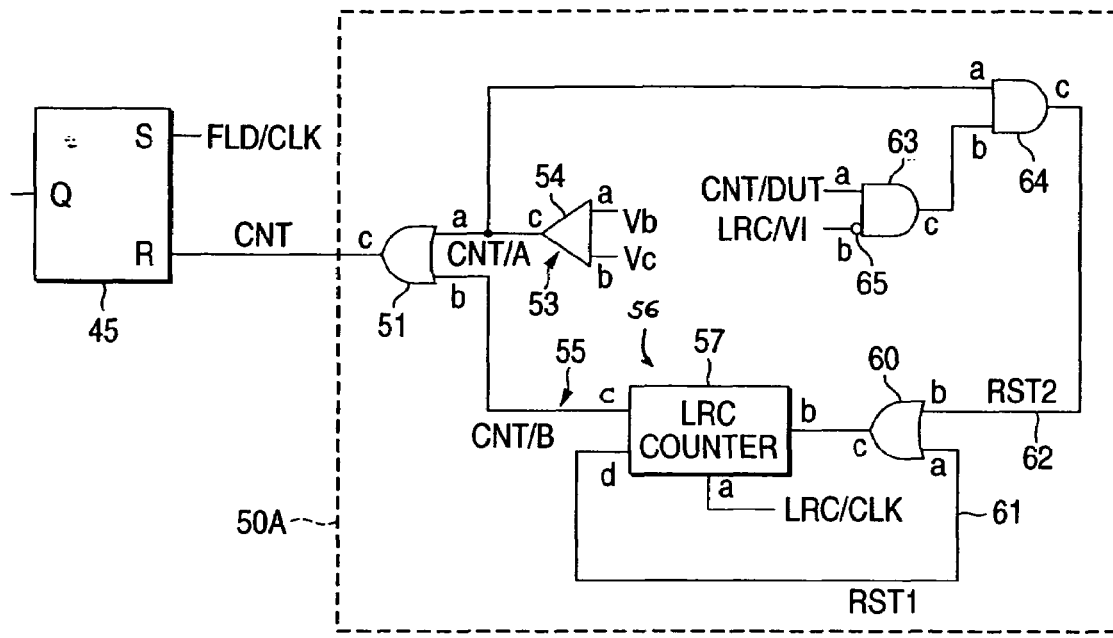
FIG. 4 is an electric circuit diagram showing the details of a part of a voltage control device in embodiment 2 of a control device for a vehicle AC generator according to the invention.

FIG. 4 is an electric circuit diagram showing embodiment 2 of a control device for a vehicle AC generator according to the invention. This embodiment 2 is the embodiment corresponding to the second object, and instead of the voltage control circuit 50 of the embodiment 1, a voltage control circuit 50A in which a load response control LRC is introduced is used, and this embodiment is constructed to improve such disadvantage that especially in the case where this load response control LRC is released, and in the case where the on time ratio TRon of the power transistor 41, that is, the generation rate G of the AC generator 10 is temporarily lowered, it can not be caught by the generation rate monitor circuit 47.

FIG. 4 shows an inner circuit of the voltage control circuit 50A used in the embodiment 2, together with an SR flip-flop 45. A power transistor 41 of a voltage control device 40, a flywheel diode 43, and a generation rate monitor 47 are the same as those of FIG. 1, and besides, an AC generator 10, an on-board battery 20, electric loads 21 and 23, and an electronic control unit (ECU) 30 are also the same as those of FIG. 1. Similarly to the embodiment 1, a field clock pulse FLD/CLK with a constant period is supplied to a set input S of the SR flip-flop 45, a control pulse CNT is supplied to a reset input R thereof, and an output Q thereof is connected to a base B of the power transistor 41 to on/off control the power transistor 41.

The voltage control circuit 50A includes an OR circuit 51, and a first and a second off timing control circuits 53 and 55. The OR circuit 51 has two inputs of an input a and an input b, and its output c is the control pulse CNT and is supplied to the reset input R of the SR flip-flop 45. The input a of the OR circuit 51 is connected to the first off timing control circuit 53, and receives a first control pulse CNT/A from this first off timing control circuit 53. The first off timing control circuit 53 includes the same comparator 54 as that used in the embodiment 1, and the comparator 54 generates the control pulse CNT/A at an output c, and supplies this as the first control pulse CNT/A to the input a of the OR circuit 51.

The input b of the OR circuit 51 is connected to the second off timing control circuit 55, and receives a second control pulse CNT/B from this second off timing control circuit 55. This second off timing control circuit 55 includes a load response control circuit (LRC circuit) 56, and controls an off timing of the power transistor 41 in accordance with an increase in electric load to the AC generator 10. The load response control circuit 56 of the second off timing control circuit 55 includes a load response control counter (LRC counter) 57, an OR circuit 60, a first control signal circuit 61 and a second control signal circuit 62.

Figure 5A:
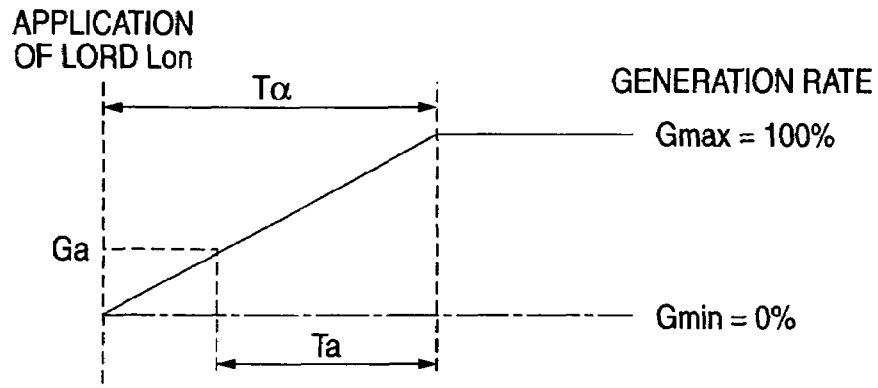
FIGS. 5A and 5B are operation explanatory diagrams of the embodiment 2.
Figure 5B:
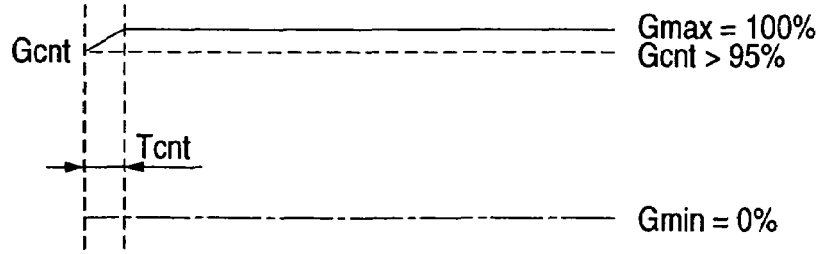

The LRC counter 57 is a hold reset counter for counting an LRC clock LRC/CLK, and when the drive rotation speed of the AC generator 10 driven by the engine is lower than the load response release rotation speed N0, a load response control characteristic LRC shown in FIG. 5A is given to the power transistor 41 by means of the second control pulse CNT/B, and when the drive rotation speed of the AC generator 10 exceeds the load response release rotation speed N0, the load response control LRC of FIG. 5A is released, and a regulated load response control characteristic CNT/LRC shown in FIG. 5B is given to the power transistor 41 by means of the second control pulse CNT/B. The load response control characteristic LRC shown in FIG. 5A is given from the LRC counter 57 on the basis of a first reset signal RST1 from the first control signal circuit 61. Besides, the regulated load response control characteristic LRC/CNT shown in FIG. 5B is given from the LRC counter 57 on the basis of a second reset signal RST2 from the second control signal circuit 62.

In FIGS. 5A and 5B, the horizontal axis indicates the time, and the vertical axis indicates the generation rate G of the AC generator 10. The load response characteristic LRC of FIG. 5A indicates the change of the generation rate G at the time when a load is applied to the AC generator 10, and typically, when the generation rate G is 0%, and when the load is applied at a timing indicated by Lon, the power transistor 41 is controlled so that the generation rate G is linearly increased at α rising rate α from a lower limit Gmin to an upper limit Gmax in a specified time period Tα. The lower limit Gmin is, for example, 0%, the upper limit Gmax is 100%, and the time period Tα is set to, for example, 1000 msec. When the load is applied at a generation rate Ga between the lower limit Gmin and the upper limit Gmax, the power transistor 41 is controlled so that the generation rate G is linearly increased at the same rising rate α from Ga to the upper limit Gmax in a time period Tα.

According to the regulated load response characteristic CNT/LRC of FIG. 5B, the power transistor 41 is controlled so that the generation rate G is linearly increased from a regulated value Gcnt close to the upper limit Gmax at the same rising rate α as the load response control characteristic LRC to the upper limit Gmax in a specified time period Tcnt (Tcnt<Tα). Although the regulated value Gcnt is an intermediate value between the lower limit Gmin and the upper limit Gmax, it is set to the intermediate value close to the upper limit Gmax. Specifically, this regulated value Gcnt is set to a generation rate of 95% or higher, for example, 95%. The time period Tcnt is set to 100 msec or less in accordance with the time constant of the field coil 13, for example, 100 msec.

Now, the details of the second off timing control circuit 55 will be described. The LRC counter 57 includes an input a to which the LRC clock LRC/CLK is inputted, a reset input b, an output c, and a reset output d. The output c is connected to the input b of the OR circuit 51, and supplies the second control pulse CNT/B to the input b of the OR circuit 51. The LRC clock LRC/CLK supplied to the input a of the LRC counter 57 is made the clock having a period shorter than the field clock FLD/CLK given to the S input of the RS flip-flop 45.

The OR circuit 60 of the second off timing control circuit 55 constitutes a reset control circuit for the LRC counter 57. This OR circuit 60 has two inputs a and b and an output c. The input a of the OR circuit 60 is connected to the first control signal circuit 61, and the first control signal circuit 61 is connected to the reset output d of the LRC counter 57. This first control signal circuit 61 supplies the first reset signal RST1 to the input a of the OR circuit 60. The input b of the OR circuit 60 is connected to the second control signal circuit 62, and receives the second reset signal RST2 from this second control signal circuit 62. The output c of the OR circuit 60 is connected to the reset input b of the LRC counter 57, and supplies the first reset signal RST1 or the second reset signal RST2 to the reset input b of the LRC counter 57.

The LRC counter 57 of the second off timing control circuit 55 counts the LRC clock LRC/CLk supplied to the input a, and when the count value becomes a count target value C0+nα (n is a natural number), the output c comes to have the high level (HIGH), and further, when this count value becomes C0+(n+1)α, the reset output d comes to have the high level, and this reset output d is given to the reset input b through the output c from the input a of the OR circuit 60, so that a next count target value is held at C0+(n+1)α, and the count value is reset to 0. Incidentally, n is incremented by one every time the count value of the LRC counter 57 is reset to 0.

The count value of the LRC counter 57 becomes the count target value C0+nα, the output c comes to have the high level (HIGH), the SR flip-flop 45 is reset, and every time the power transistor 41 is turned off, the first control signal circuit 61 raises the count target value of the LRC counter 57 so that the count target value reaches the count value C0+(n+1)α corresponding to the rising rate α from the off timing. As a result, the off timing of the power transistor 41 is delayed from the field clock pulse FLD/CLK by a time corresponding to the rising rate α every time the power transistor 41 is turned off by the first reset signal RST1 from the first control signal circuit 61, and the load response characteristic of the rising rate α shown in FIG. 5A is given to the power transistor 41.

The second control signal circuit 62 includes two AND circuits 63 and 64. The AND circuit 63 receives a regulated duty signal CNT/DUT at an input a. Besides, an inverter 65 is connected to an input b of the AND circuit 63, and receives an inversion signal of a load response control valid invalid signal LRC/VI at the input b. The regulated duty signal CNT/DUT is a reset signal CNT/RST for giving the regulated load response characteristic CNT/LRC to the generation rate G at the rising rate α from the regulated value Gcnt of the regulated generation rate to the upper limit Gmax, and in the embodiment 2, the regulated value Gcnt of the generation rate G is regulated within the range of 95% to 100%. Specifically, at the start of the regulated load response control CNT/LRC, and at the off timing when the generation rate G is made the regulated value of 95%, the reset signal CNT/RST is given to the reset input b of the LRC counter 57, and subsequently, the reset timing of the LRC counter 57 is delayed by the rising rate α.

The load response control valid invalid signal LRC/VI comes to have the high level (HIGH) when the drive rotation speed of the AC generator 10 is the load response control release rotation speed NO or less and the second off timing control circuit 55 gives the load response characteristic LRC of FIG. 5A to the power transistor 41, and this signal gives the low level (LOW) to the input b of the AND circuit 63 through the inverter 65. Besides, this signal comes to have the low level (LOW) when the drive rotation speed of the AC generator 10 exceeds the load response release rotation speed NO and the second off timing control circuit 55 gives the regulated load response control characteristic CNT/CLK to the power transistor 41, and it gives the high level (HIGH) to the input b of the AND circuit 63 through the inverter 65. That is, when this load response control valid invalid signal LRC/VI comes to have the high level, the regulated duty signal CNT/DUT is not outputted from the AND circuit 63, however, when the load response control valid invalid signal LRC/VI comes to have the low level (LOW), the regulated duty signal CNT/DUT appears at the output c of the AND circuit 63.

An input a of the AND circuit 64 is connected to the output c of the comparator 54, and receives the control pulse CNT/A. An input b thereof is connected to an output c of the AND circuit 63. Accordingly, in a high generation rate area in which the battery voltage Vb exceeds the reference voltage Vref and the first control pulse CNT/A has the high level (HIGH), the regulated duty signal CNT/DUT appearing at the output c of the AND circuit 63 appears at the output c of the AND circuit 64, and is consequently supplied as the second reset signal RST2 to the reset input b of the LRC counter 57 from the input b of the OR circuit 60 through the output c. The regulated duty signal CNT/DUT supplied as the second reset signal RST2 to the reset input b of the LRC counter 57 gives the regulated load control CNT/LRC of FIG. 5B to the power transistor 41.

FIGS. 6(a) to 6(d) are timing charts exemplifying the transition of the generation rate G and the on time Ton of the power transistor 41 according to the embodiment 2 with respect to seven continuous control periods T1 to T7. In FIGS. 6(a) to 6(d), ton1, ton2, . . . , ton7 denote the on timings of the power transistor 41 in the respective control periods, and toff1, toff2, . . . , toff7 denote the off timings thereof.

FIGS. 6(a) and 6(b) show states in which the drive rotation speed of the AC generator 10 is larger than the load response control rotation speed N0, and the load response control LRC by the voltage control circuit 50A is performed. FIG. 6(a) shows a state in which the load is constant, and the generation rate of the AC generator 10 and the on time Ton of the power transistor 41 are constant and a transition is made. In this state, the on time Ton of the power transistor 41 is made Ton=A. FIG. 6(b) shows a state in which the load is applied, and the generation rate rises at the rising rate a in the control periods T1, T2, . . . , T7. In this state, the on time of the power transistor 41 is A in the first control period T1, and is successively increased by α in the subsequent control periods T2, T3, . . . , T7.

FIG. 6(c) shows a state in which the drive rotation speed of the AC generator 10 exceeds the load response control release rotation speed N0, and the load response control LRC is released. It is assumed that in the control periods T1 and T2, the generation rate G is the upper limit Gmax=100%, and the on period Ton of the power transistor 41 is Ton/100, and in the subsequent control period T3, for example, by the temporal lowering of the battery voltage Vb, the generation rate G is lowered by the first off timing control circuit 53, and the on time of the power transistor 41 is lowered to Ton=A. In this case, in the next control period T4, a control is performed so that the generation rate becomes Gcnt=95% by the regulated duty signal CNT/DUT, and the on period of the power transistor becomes Ton/cnt. In the subsequent control periods T5, T6 and T7, the on period of the power transistor 41 is successively increased to (Ton/cnt+α), (Ton/cnt+2α), and (Ton/cnt+3α), and the off timing to the power transistor 41 is given as Toff5, toff6 and toff7, and the off period is also maintained.

Figure 6:
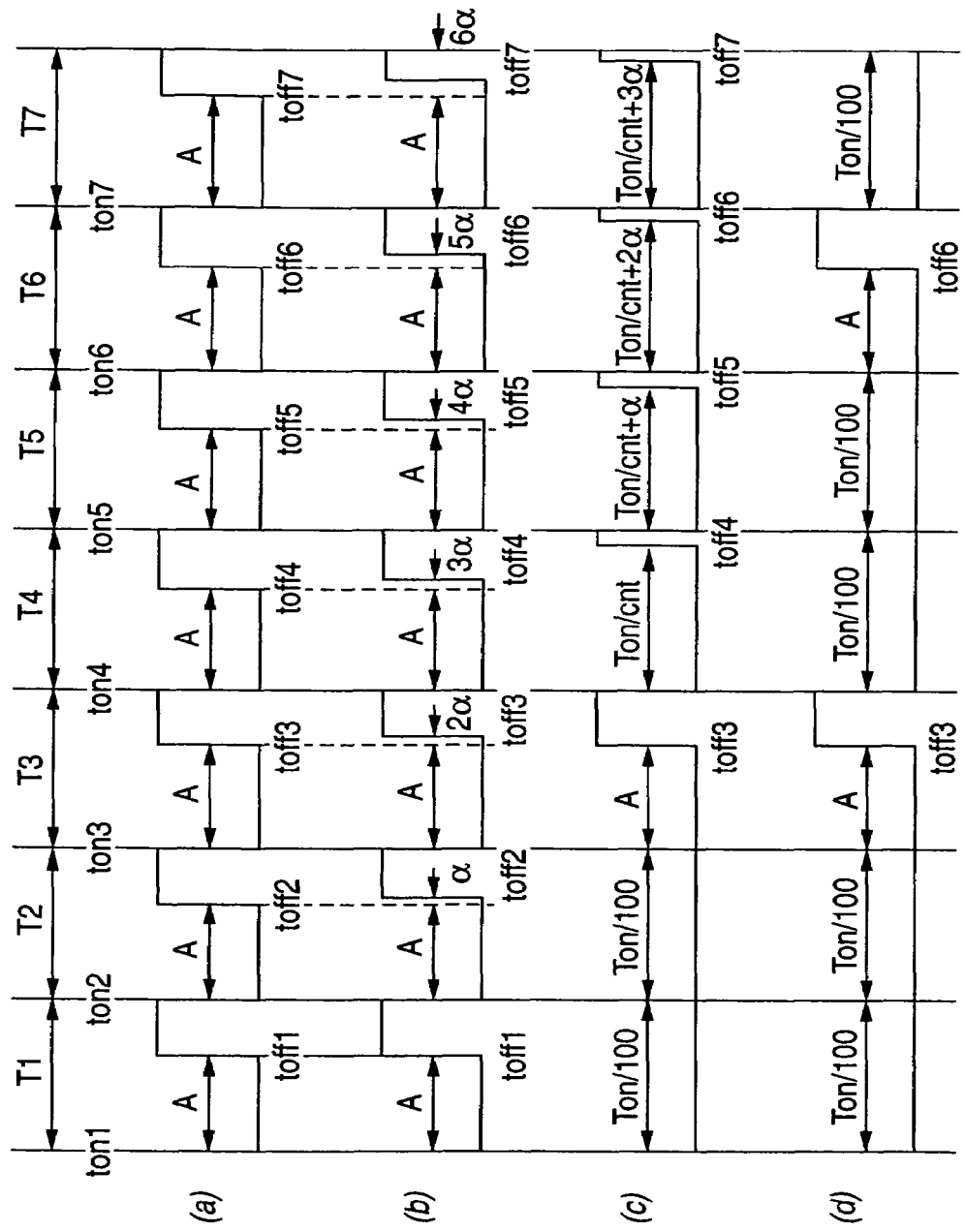
FIGS. 6(*a*) to 6(*d*) are operation explanatory diagrams of the embodiment 2.

As stated above, when the load response control LRC is released, even if the generation rate G is temporarily lowered in the control period T3 of FIG. 6©, according to the embodiment 2, subsequently to that, in the regulated time period Tcnt, the regulated load response CNT/LRC is given in the control periods T4 to T7, and plural control periods T are ensured in which the off time is given to the power transistor 41. In the case where this regulated load response control CNT/LRC is not given, as shown in FIG. 6(d), after the generation rate G is lowered in the one limited control period T3, the generation rate G immediately becomes the upper limit Gmax in the control periods T4 and T5, and as a result, the control period continues in which the off time is not given to the power transistor 41. Even if the generation rate G is again temporarily lowered in the control period T6, thereafter, the generation rate G again becomes the upper limit Gmax, and the state continues in which the off time is not given to the power transistor 41.

The limited lowering of the generation rate G in one control period as shown in FIG. 6(d) can not be often caught by the generation rate monitor circuit 47. When the lowering of the generation rate G in the limited control period can not be caught by the generation rate monitor circuit 47, the monitor output MON can not also accurately monitor the generation rate G, and there is a fear that the electronic control unit (ECU) also gives an erroneous control.

Figure 7:
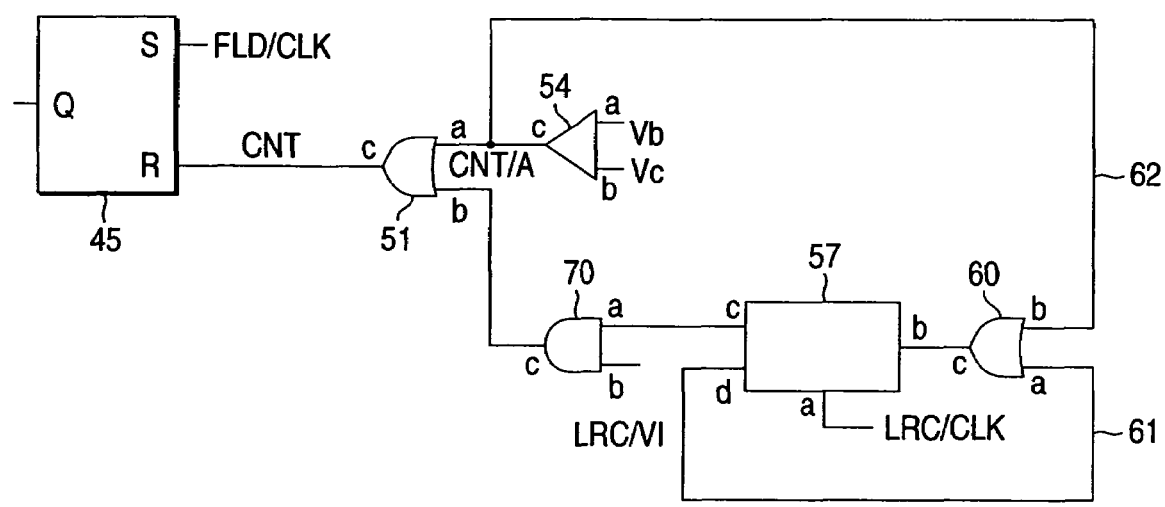
FIG. 7 is an electric circuit diagram showing a part of a voltage control device in a comparative example to be compared with the embodiment 2.

FIG. 7 shows a comparative example to be compared with the embodiment 2. In this comparative example, an AND circuit 70 is disposed between an output c of an LRC counter 57 and an input b of an OR circuit 51. An input a of this AND circuit 70 is connected to the output c of the LRC counter 57, a load response control valid invalid signal LRC/VI is supplied to an input b of the AND circuit 70, and an output c of the AND circuit 70 is connected to the input b of the OR circuit 51. In the comparative example shown in FIG. 7, in the case where the load response control LRC is not given, since the load response control valid invalid signal LRC/VI comes to have the low level (LOW), the regulated load response control CNT/LRC as in the embodiment 2 is not given. Thus, as shown in FIG. 6D, there occurs the temporal lowering of the generation rate G limited to one control period, and there arises a state where this can not be caught by the generation rate monitor 47.

As described above, in the embodiment 2, in the case where the load response control LRC is released, even if the generation rate G is temporarily lowered, since the regulated load response control CNT/LRC is subsequently given, the generation rate monitor circuit 47 can certainly catch the lowering of the generation rate, and in the case where the generation rate monitor output MON is used in the electronic control unit 30, the control can be certainly carried out.

The control apparatus of the vehicle AC generator according to the present invention can be used as, for example, a control apparatus of an AC generator mounted on a vehicle.

What is claimed is:

1. A control device for a vehicle AC generator which outputs a rectified AC output and feeds it to an on-board battery and electric loads of a vehicle, the control device comprising:
   a power transistor for controlling a field current of the vehicle AC generator;
   a flip-flop for on/off controlling the power transistor in each of control periods repeated at a constant period; and
   a generation rate monitor circuit for monitoring an on time ratio of the power transistor in each of the control periods to monitor a generation rate, wherein
   the flip-flop receives a clock pulse with a constant period and a control pulse,
   the clock pulse sets the control period and decides an on timing of the power transistor in the control period, and
   the control pulse decides an off timing of the power transistor in the control period.

2. The control device for the vehicle AC generator according to claim 1, wherein the flip-flop includes a first input for receiving the clock pulse, a second input for receiving the control pulse, and an output for driving the power transistor.

3. The control device for the vehicle AC generator according to claim 2, further comprising a voltage control circuit connected to the second input of the flip-flop, wherein the voltage control circuit supplies the control pulse to the second input of the flip-flop in each of the control periods.

4. The control device for the vehicle AC generator according to claim 3, wherein the voltage control circuit adjusts a position of the control pulse with respect to the clock pulse in accordance with a battery voltage of the on-board battery.

5. The control device for the vehicle AC generator according to claim 4, wherein the voltage control circuit includes a comparator, and the comparator compares the battery voltage with a reference voltage to generate the control pulse.

6. The control device for a vehicle AC generator according to claim 5, wherein the control pulse supplied at the second input of the flip-flop decides the off timing of the power transistor and the clock pulse with the constant period sets the control period at the constant period and decides the on timing of the power transistor.

7. The control device for a vehicle AC generator according to claim 5, wherein the comparator is positioned in the voltage control circuit.

8. The control device for a vehicle AC generator according to claim 1, wherein output from the flip-flop turns on and off the power transistor.

9. The control device for a vehicle AC generator according to claim 1, wherein the generation rate monitor circuit is connected to the collector of the power transistor.

10. A control device for a vehicle AC generator which outputs a rectified AC output and feeds it to an on-board battery and electric loads of a vehicle, the control device comprising:
a voltage control device for repeatedly giving, at a constant period, control periods to a power transistor for controlling a field current of the vehicle AC generator and for adjusting an on time ratio of the power transistor in each of the control periods to control a generation rate; and
a generation rate monitor circuit for monitoring the generation rate, wherein
the voltage control device includes a load response control circuit for controlling the generation rate in accordance with an increase in load,
the load response control circuit includes a first and a second control signal circuits,
the first control signal circuit performs a load response control for adjusting the generation rate between a lower limit and an upper limit in accordance with the increase in the load, and
the second control circuit performs, in a case where the load response control is released, a regulated load response control for adjusting the generation rate between a regulated value closer to the upper limit than to the lower limit and the upper limit in accordance with the increase in the load.

11. The control device for the vehicle AC generator according to claim 10, wherein
the voltage control device includes a flip-flop for on/off controlling the power transistor,
the flip-flop sets the control period by a clock pulse with a constant period, decides an on timing of the power transistor in the control period, and decides an off timing of the power transistor in the control period by a control pulse, and
the load response control circuit adjusts a position of the control pulse with respect to the clock pulse, and adjusts an on time ratio of the power transistor in the control period.

12. The control device for the vehicle AC generator according to claim 11, wherein
the voltage control device includes a voltage control circuit for supplying the control pulse to the flip-flop,
the voltage control circuit includes a first and a second off timing control circuits,
the first off timing control circuit adjusts a position of the control pulse with respect to the clock pulse in accordance with a battery voltage of the on-board battery, and
the second off timing control circuit adjusts the position of the control pulse with respect to the clock pulse by the load response control circuit.

13. The control device of the vehicle AC generator according to claim 10, wherein
the load response control circuit includes a load response control counter, and
the load response control counter counts load response control clocks and includes an output for generating the control pulse when a count value reaches a count target value.

14. The control device for the vehicle AC generator according to claim 13, wherein
the load response control counter includes a reset output and a reset input, and generates a reset output when a specified number of the load response control clocks are counted after the count value reaches the count target value, and
the first control signal circuit is connected to the reset output, increases and holds the count target value by the reset output, resets the counter value, and performs the load response control.

15. The control device for the vehicle AC generator according to claim 14, wherein the second control signal circuit is connected to the reset input of the load response control counter, and the regulated load response control is performed from the regulated value.

16. The control device for the vehicle AC generator according to claim 10, wherein the lower limit is set to a generation rate of 0%, and the upper limit is set to a generation rate of 100%.

17. The control device for the vehicle AC generator according to claim 16, wherein the regulated value is set to a generation rate of 90 to 100%.

18. The control device for the vehicle AC generator according to claim 17, wherein the regulated value is set to a generation rate of approximately 95%.

19. The control device for the vehicle AC generator according to claim 10, wherein the regulated load response control is performed in a limited regulation period of 100 msec or less from the increase in the load.

* * * * *